(12) United States Patent
Zhou (10) Patent No.: US 10,972,630 B2
(45) Date of Patent: *Apr. 6, 2021

(54) METHOD FOR FLATTENING LASER-BASED IMAGE OF CURVED BOOK PAGE

(71) Applicant: DALIAN CZUR TECH CO., LTD., Liaoning (CN)

(72) Inventor: Kang Zhou, Liaoning (CN)

(73) Assignee: DALIAN CZUR TECH CO., LTD., Liaoning (CN)

(*) Notice: Subject to any disclaimer, the term of this patent is extended or adjusted under 35 U.S.C. 154(b) by 70 days.

This patent is subject to a terminal disclaimer.

(21) Appl. No.: 16/475,009

(22) PCT Filed: May 10, 2016

(86) PCT No.: PCT/CN2016/081571
§ 371 (c)(1),
(2) Date: Jun. 28, 2019

(87) PCT Pub. No.: WO2017/185407
PCT Pub. Date: Nov. 2, 2017

(65) Prior Publication Data
US 2020/0186672 A1   Jun. 11, 2020

(30) Foreign Application Priority Data
Apr. 28, 2016 (CN) .......................... 201610279456.5

(51) Int. Cl.
*H04N 1/04* (2006.01)
*H04N 1/40* (2006.01)
*H04N 1/10* (2006.01)

(52) U.S. Cl.
CPC ........... *H04N 1/40037* (2013.01); *H04N 1/10* (2013.01)

(58) Field of Classification Search
CPC ..... H04N 1/40037; H04N 1/10; H04N 1/0282
(Continued)

(56) References Cited

U.S. PATENT DOCUMENTS 6,940,664 B1 * 9/2005 Pilu .................... G06T 3/0031
359/806
7,601,978 B2 * 10/2009 Sari-Sarraf ............ D06H 3/08
250/559.06

(Continued)

FOREIGN PATENT DOCUMENTS

CN            101033953 A       9/2007

OTHER PUBLICATIONS

Zhang, Zheng et al. "Correcting Document Image Warping Based on Regression of Curved Text Lines", Computer Society, Dec. 31, 2003, p. 1-6, Proceedings of the Seventh International Conference on Document Analysis and Recognition (ICDAR'03), School of Computing, National University of Singapore 3 Science Drive 2, Singapore 117543.

(Continued)

*Primary Examiner* — Cheukfan Lee
(74) *Attorney, Agent, or Firm* — Novick, Kim & Lee, PLLC; Allen Xue (57) ABSTRACT

Provided is a method for flattening a laser-based image of a curved book page, which is applicable to a scanning platform and an image acquisition device and a laser generation device fixed above the scanning platform. The flattening method includes the following steps of: opening a book on a horizontally arranged scanning platform, and emitting a laser beam to a curved book page to be scanned, the laser beam forming a plurality of laser lines parallel on the curved book page; acquiring a horizontal image of the curved book page having the parallel laser lines, and acquiring a 2D planar coordinate (x, y) of each pixel on the laser line in the (Continued)

horizontal image; calculating, according a y-coordinate in the 2D planar coordinate, a y-coordinate of an intersection line of the laser beam and the scanning platform, and an intersection angle of the laser beam and the scanning platform, and by means of a tangent function, a height of each pixel on the laser line, i.e., an actual spatial height; calculating actual spatial heights of all pixels on each laser line, i.e., z-coordinates, to acquire a 3D spatial curve of the laser line; constructing, using the curve, an actual 3D curved surface of the photographed book page; and flattening the 3D curved surface after pixel value transfer to complete flattening of the curved book page.

4 Claims, 5 Drawing Sheets

(58) Field of Classification Search
USPC .......................................... 358/474, 471, 448
See application file for complete search history.

(56) References Cited

U.S. PATENT DOCUMENTS

| 2005/0058332 | A1* | 3/2005 | Kaufman | G03B 35/00 |
| | | | | 382/133 |
| 2015/0109418 | A1* | 4/2015 | Lin | G06T 7/85 |
| | | | | 348/47 |
| 2019/0182398 | A1* | 6/2019 | Zhou | H04N 1/00328 |
| 2020/0186672 | A1* | 6/2020 | Zhou | H04N 1/387 |
| 2020/0204698 | A1* | 6/2020 | Zhou | H04N 1/00204 |

OTHER PUBLICATIONS

Zhang, Zheng et al. "Restoration of Curved Document Images through 3D Shape Modeling", Computer Society, Dec. 31, 2004, p. 1-6, Proceedings of the 2004 IEEE Computer Society Conference on Computer Vision and Pattern Recognition (CVPR'04), School of Computing, National University of Singapore 3 Science Drive 2, Singapore 117543.

* cited by examiner

```
┌─────────────────────────────────────────────────────────────────────┐
│ Open a book on a horizontally arranged scanning platform, and project a laser beam │
│ onto a curved book page to be scanned, wherein the laser beam forms a plurality of │
│           parallel laser lines on the curved book page              │
└─────────────────────────────────────────────────────────────────────┘
                                  ↓
┌─────────────────────────────────────────────────────────────────────┐
│ Acquire a horizontal image of the curved book page having the parallel laser lines, │
│  and acquire a 2D planar coordinate (x, y) of each pixel on the laser line in the   │
│                          horizontal image                           │
└─────────────────────────────────────────────────────────────────────┘
                                  ↓
┌─────────────────────────────────────────────────────────────────────┐
│  Calculate, according a y-coordinate in the 2D planar coordinate, a y-coordinate of │
│ an intersection line of the laser beam and the scanning platform, and an intersection │
│  angle of the laser beam and the scanning platform, and by means of a tangent       │
│    function, a height of each pixel on the laser line, i.e., an actual spatial height │
└─────────────────────────────────────────────────────────────────────┘
                                  ↓
┌─────────────────────────────────────────────────────────────────────┐
│ Calculate actual spatial heights of all pixels on each laser line, i.e., z-coordinates, to │
│  acquire a 3D spatial curve of the laser line, thus constructing, using the curve, an │
│              actual 3D curved surface of the acquired book page      │
└─────────────────────────────────────────────────────────────────────┘
                                  ↓
┌─────────────────────────────────────────────────────────────────────┐
│    Calculate the pixel in the 3D curved surface corresponding to the pixel in the   │
│  horizontal image of the curved book page, replace a pixel value of the pixel in the │
│    3D curved surface with a pixel value of the corresponding point, and complete    │
│  image transformation of page contents from a planar image of the curved book page  │
│                          to the 3D curved surface                   │
└─────────────────────────────────────────────────────────────────────┘
                                  ↓
┌─────────────────────────────────────────────────────────────────────┐
│ Flatten the 3D curved surface after pixel value transformation to complete flattening │
│                         of the curved book page                     │
└─────────────────────────────────────────────────────────────────────┘
```

Fig. 6

METHOD FOR FLATTENING LASER-BASED IMAGE OF CURVED BOOK PAGE

TECHNICAL FIELD

The present invention relates to a method for flattening a laser-based image of a curved book page. The present invention relates to the patent of H04N image communications of electrical communication technology with the patent classification number of H04, such as scanning, transmission or reproduction of television H04N1/00 document or analogues like fax transmission; and components and parts like H04N1/04 scanning device and H04N1/10 application planar image supporting plane.

BACKGROUND ART

With the development of video collection and processing technology, a scanner has been upgraded from traditional light-sensitive scanner to a new generation of image collection scanner based primarily on video image collection. This new type of scanner collects a photo of a page through a camera located above the scanned object so that the scanning can be completed, which eliminates the heavy workload caused by the traditional scanning method of manually pressing a presswork to be scanned on a scanning surface, so as to have the great advantage of fast scanning speed.

However, when such image acquisition scanner scans a scanned object having a certain thickness, such as a dictionary or a textbook with a large thickness, a scanning image scanned in the page in the middle of the book may have a large curvature, which seriously affects the reading quality, and the curvature may have a serious impact on subsequent OCR text recognition.

The published patent also discloses the technical solution capable of solving the above technical problems to a certain extent, but the algorithm principle is complex, requiring intensive computation and a specific dual-camera application setting.

SUMMARY OF THE INVENTION

To solve the above-stated problems, the present disclosure provides a method for flattening a laser-based image of a curved book page applicable to a scanning platform, and an image acquisition device and a laser generation device fixed above the scanning platform, wherein the flattening method comprises the following steps of:

opening a book on a horizontally arranged scanning platform, and emitting a laser beam to a curved book page to be scanned, the laser beam forming a plurality of laser line parallel on the curved book page;

acquiring a horizontal image of the curved book page having the parallel laser line parallels, and acquiring a 2D planar coordinate (x, y) of each pixel on the laser lines in the horizontal image;

calculating, according a y-coordinate in the 2D planar coordinate, a y-coordinate of an intersection line of the laser beam and the scanning platform, and an intersection angle of the laser beam and the scanning platform, and by means of a tangent function, a height of each pixel on the laser line, i.e., an actual spatial height;

calculating actual spatial heights of all pixels on each laser line, i.e., z-coordinates, to acquire a 3D spatial curve of the laser line, thus constructing, using the curve, an actual 3D curved surface of the acquired book page;

calculating the pixel on the 3D curved surface corresponding to the pixel in the horizontal image of the curved book page, replacing pixel value of the pixel on the 3D curved surface with pixel value of the corresponding point, to complete image transformation of page contents from a planar image of the curved book page to the 3D curved surface; and flattening the 3D curved surface after pixel value transformation to complete flattening of the curved book page.

As a preferred embodiment, the calculating, by means of a tangent function, each pixel comprises specific steps of:

according to the y-coordinate in the 2D planar coordinate (x, y), calculating a distance difference d between an orthographic projection point of an intersection point on the scanning platform and the intersection line of the laser beam and the scanning platform, the intersection point being a point where a pixel on a laser line intersects the curved surface of the book page, d=l1−y, wherein l1 represents a distance between the intersection line and an orthographic projection of a starting point of the laser beam on the scanning platform, the intersection line being a line where the laser beam intersects the scanning platform;

plugging the difference d and the intersection angle a of the laser beam and the scanning platform into formula (1); and $$f(a,d)=\tan(a)*d \quad (1)$$

calculating the actual spatial height $f(a,d)$ of each pixel on the laser line in the horizontal image, i.e., the z-coordinate of the pixel.

As a preferred embodiment, the acquiring the pixel in the 3D curved surface corresponding to the pixel in the planar image of the curved book page specifically comprises the following steps of:

according to the z-coordinate in each point (x, y, z) in the constructed 3D curved surface, and an intersection angle between a connecting line and a virtual plane, the connecting line connecting a focal point of a camera in the image acquisition device with a pre-calibrated height and the point in the 3D curved surface, and by means of a trigonometric function, calculating to obtain a distance d′ from the point on the laser line to a center point of a plane where the point is located and the plane is parallel to a plane of the scanning platform, and by means of the following formula to calculate a projection coefficient $f(x)$; the virtual plane being the plane where the point in the 3D curved surface is located, which is parallel to the scanning platform;

$$f(x)=L/d'$$

wherein, L represents a distance between an intersection point and a geometric center of the scanning platform, the intersection point being a point where a line intersects a plane of the scanning platform. The line extends from a point C right above the geometric center of the scanning platform; and according to the following formula, $$T=P \cdot f(x)$$

obtaining a point T on the constructed 3D curved surface corresponding to the pixel of the planar image, P represents a coordinate (x, y) of the 3D pixel in the horizontal image.

As a preferred embodiment, the flattening of the curved book page comprises the following steps of:

splitting the 3D curved surface after pixel value transfer into a plurality of 3D curves along an x-coordinate axis direction, arranging the pixels on the 3D curves along a straight line on the same plane to complete straightening of one 3D curve, corresponding the pixel on a 2D straight line segment formed after straightening with a length x from an end part to the pixel value of the point on the 3D curve with a chord length x from the same end part to complete straightening of a single 3D curve; and repeating the above steps to straighten all 3D curves forming the 3D curved surface, and completing straightening of the 3D curved surface.

BRIEF DESCRIPTION OF THE DRAWINGS

In order to more clearly illustrate the technical solutions in the embodiments of the present invention or the prior art, the drawings to be used in the embodiments or the description of the prior art will be briefly introduced below. Obviously, the drawings in the following description merely indicate some embodiments of the present invention, and those skilled in the art can further obtain other drawings according to these drawings without going through any creative work.

DETAILED DESCRIPTION OF EMBODIMENTS

In order to make the objects, the technical solutions and the advantages of the embodiments of the present invention clearer, the technical solutions in the embodiments of the present invention are clearly and completely described with reference to the drawings in the embodiments of the present invention.

As shown in FIGS. 1 to 6, a method for flattening laser-based image of curved book page is applicable to a scanner based on an image acquisition principle, and can flatten a curvature of an opened book page with a certain curvature using an algorithm to finally present a flat scanned image.

In the embodiment, the scanner is specifically defined, which comprises a scanning platform (in the embodiments of the present invention, the scanning platform is rectangular or in a shape with a clear collection center) which is generally horizontally arranged when being in an operational state and an image acquisition device (camera) which is fixed above the scanning platform. In order to generate a laser line serving as a curve flattening reference, a necessary laser beam emitting device is provided, for the convenience of calculation, in the present embodiments, a starting point of the laser beam emitted by the laser generation device is located right above an edge of a bottom part of the scanning platform, when the scanning platform is rectangular, the bottom part is preferably a long edge, the other long edge is correspondingly defined as a top part, and two short edges are defined as two sides.

Correspondingly, in a planar coordinate system, an x-axis is parallel to the long edge of the scanning platform, a y-axis is parallel to the short edge of a rectangle of the scanning platform, and a z-axis is perpendicular to the plane of the scanning platform, thus defining starting points of the x-axis and the y-axis as an angle of the rectangle.

The book page to be scanned is horizontally opened and placed on the scanning platform. The laser generation device is controlled to project the laser beam onto the book page. Since the generation device is arranged at the bottom part, each fan-shaped laser beam is inclined, that is, the fan-shaped laser beam has an angle with the scanning platform, and a straight line segment is formed on the scanning platform.

After the laser line appears on the book page, in the embodiment, three laser lines are provided, which are parallel to ensure a construction accuracy. In an algorithm principle, one laser line satisfies the requirement of subsequent construction of the curved surface. It should be noted that, due to the curvature of the book page, the laser line in the planar image has the same curvature as a radian of the book page, so that when all the laser lines or the line segments are described in the present disclosure as being parallel, the horizontal image of the curved book page can be acquired by the image acquisition device.

An image of the laser line can be acquired through the algorithm, such as simple binarization, and the 2D planar coordinate (x, y) of the laser line in the horizontal image can be acquired through the planar coordinate system (x, y) mentioned.

Figure 1:
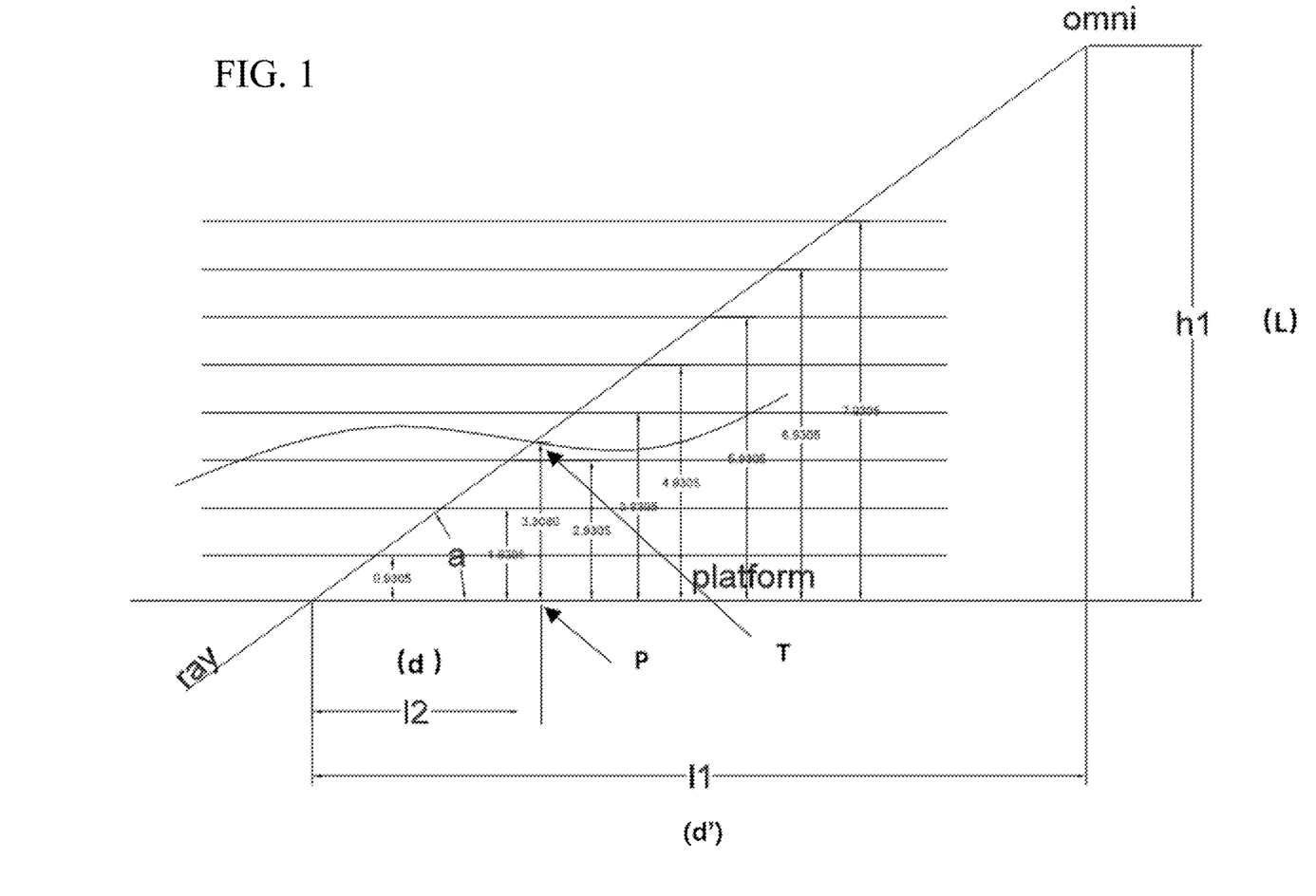
FIG. 1 is a calibration principle diagram of the present invention.

As shown in FIG. 1, according to the y-coordinate in the 2D planar coordinate (x, y), a parameter d, which is the difference in the distance between an orthographic projection point of an intersection point of each pixel on the laser line and the curved surface of the book page on the scanning platform and the intersection line of the laser beam and the scanning platform is d=l1−y. l1 is a distance from the intersection line of the laser beam and the scanning platform to an orthographic projection of a starting point of the laser beam on the scanning platform.

The difference d calculated and the intersection angle a of the laser beam and the scanning platform (as an optional embodiment, the intersection angle a can be correspondingly acquired by directly setting an emitting angle of the laser beam) are plugged into formula (1); and $$f(a,d)=\tan(a)*d \qquad (1)$$

the actual spatial height $f(a,d)$ of each pixel on each laser line in the horizontal image, i.e., the z-coordinate of the pixel, is calculated.

Figure 2:
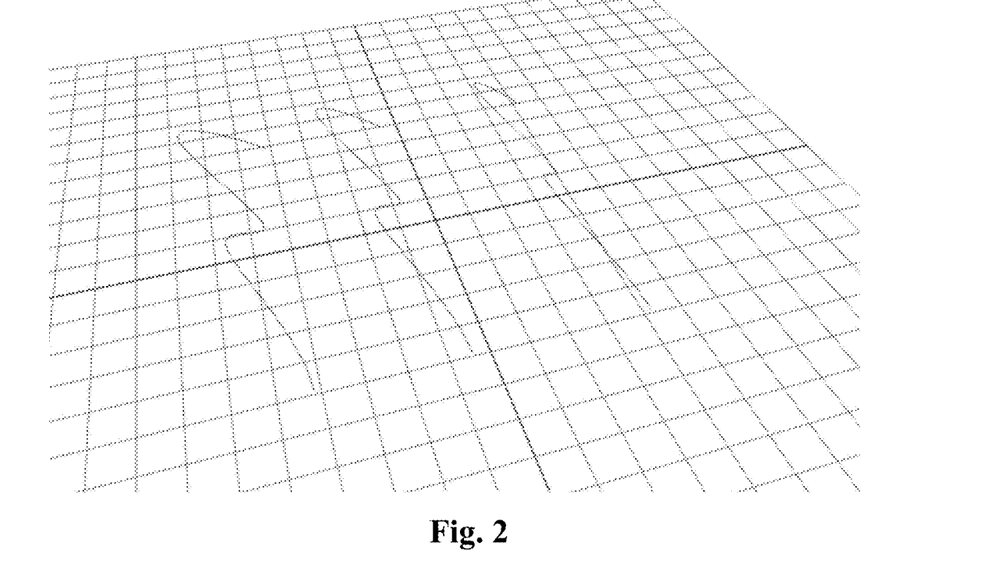
FIG. 2 is a diagram of a 3D curve constructed by the present invention.

The above steps are repeated for all the pixels on the three laser lines to acquire the z-coordinates of the pixels, and then the (x, y) coordinate in the planar image is combined to acquire the spatial coordinate (x, y, z) of each pixel, thus restoring a 3D spatial structure of the three laser lines from the planar image, as shown in FIG. 2.

Figure 3:
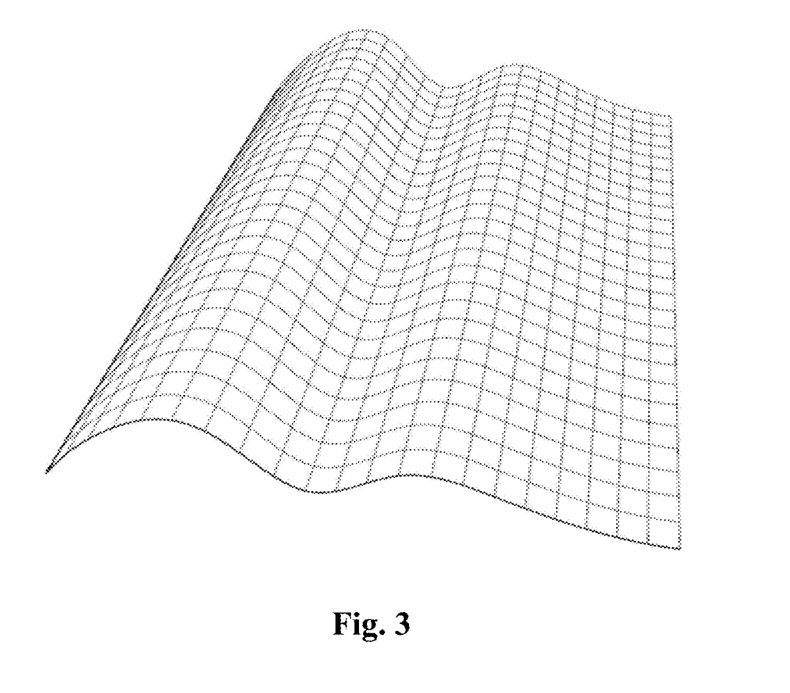
FIG. 3 is a diagram of a 3D curved surface constructed by the present invention.

Based on the 3D spatial structure of the three laser lines acquired, a solid form of the surface of the opened book page in a space can be restored. As an optional embodiment, by adopting a commonly used curve-curved surface construction method, a solid structure of the surface of the opened book page in an xyz coordinate system, i.e., the 3D curved surface mentioned above, can be acquired by means of a lofting algorithm, as shown in FIG. 3.

Figure 4:
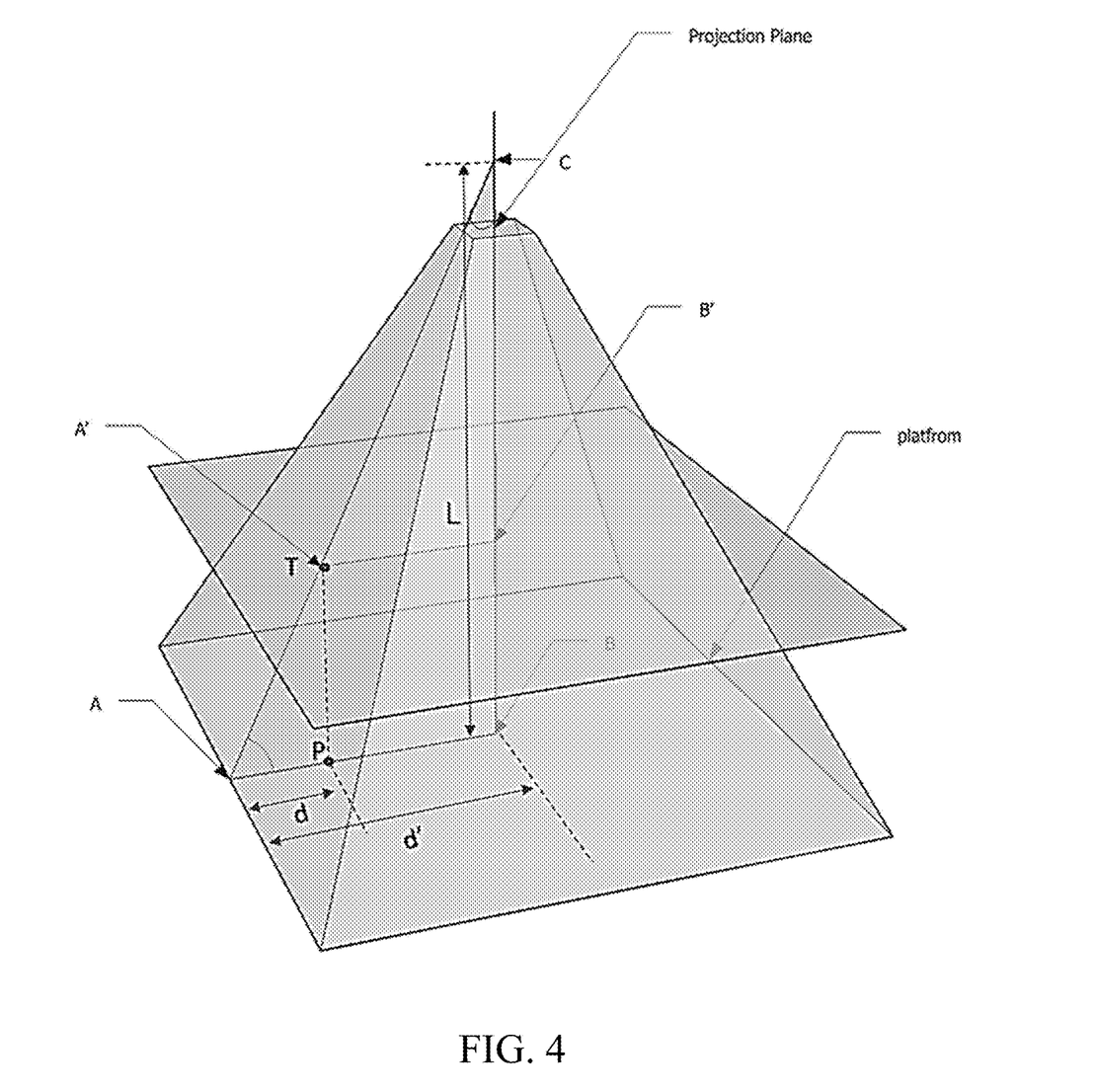
FIG. 4 is a diagram illustrating the calculation of a projection coefficient of the present invention.

According to a projection principle, a corresponding relationship between a midpoint of the 3D curved surface and the pixel in the planar image is established. According to the z-coordinate in each point (x, y, z) in the constructed 3D curved surface, and an intersection angle between a connecting line and a virtual plane, the connecting line connecting a focal point of a camera in the image acquisition device with a pre-calibrated height and the point in the 3D curved surface, and by means of a trigonometric function, calculating to obtain a distance d' from the point on the laser line to a center point of a plane where the point is located and the plane is parallel to a plane of the scanning platform, the distance d is plugged into the following function to acquire a projection coefficient $f(x)$:

$$f(x)=L/d'$$

wherein, L represents a distance between an intersection point and a geometric center of the scanning platform, the intersection point being a point where a line intersects a plane of the scanning platform, the line leading from a point C right above the geometric center of the scanning platform and passing through the point C. The virtual plane is the plane where the point in the 3D curved surface is located, which is parallel to the scanning platform; and according to the following formula, $$T=P\cdot f(x)$$

a point on the constructed 3D curved surface corresponding to the pixel in the planar image is acquired, wherein T represents a final pixel position, and P represents a coordinate position (x, y) of the 3D pixel in the horizontal image.

Figure 5:
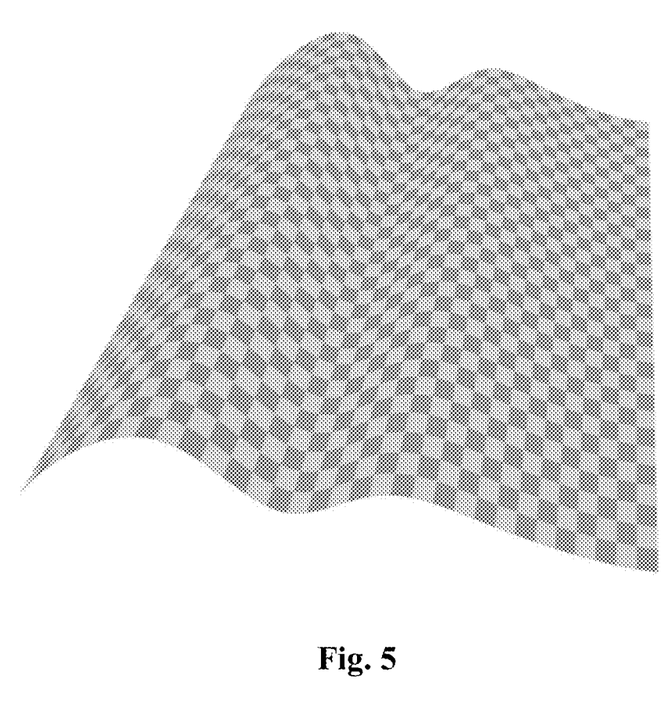
FIG. 5 is a diagram of the 3D curved surface with contents after pixel conversion.
Figure 6:
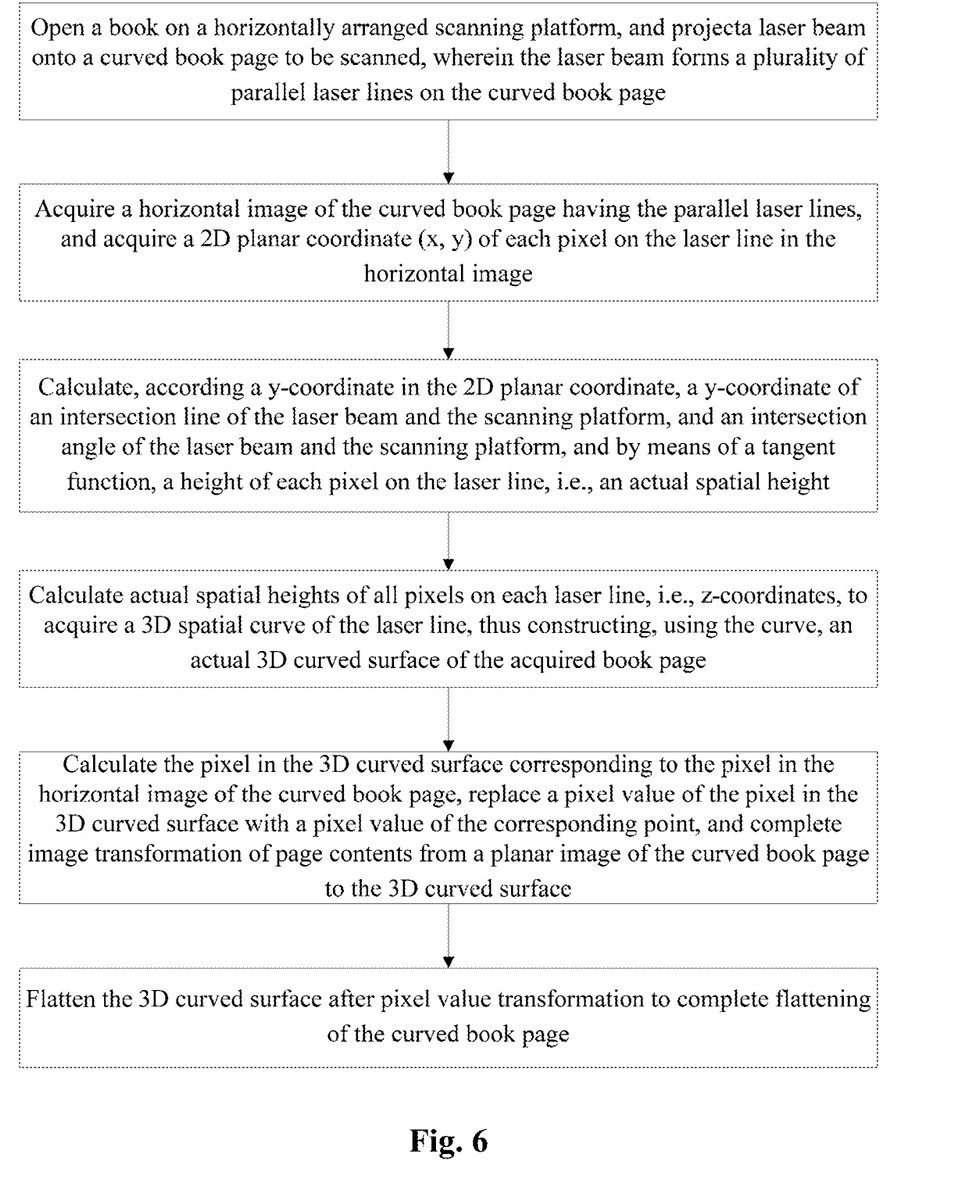
FIG. 6 is an algorithm flow chart of the present invention.

After acquiring the corresponding relationship between the pixel in the planar image and the point in the 3D curved surface, the point in the 3D curved surface is initialized into a curved surface of blank pixel and is replaced with a pixel value of the corresponding point in the planar image, that is, real restoration of the planar image to a spatial entity is completed, and the restored 3D curved surface is shown in FIG. 5.

After acquiring the 3D curved surface of the planar image of the book page acquired by real restoration, the 3D curved surface is straightened to finally complete scanning of the current book page.

In a preferred embodiment, the 3D curved surface after pixel value transfer can be split into a plurality of 3D curves along an x-coordinate axis direction, which are orthographically projected on the scanning platform and parallel to the x-axis. In actual operation, the plane can be split according to a width of the pixel (a width in a y-axis direction is set according to a pixel size) to acquire a certain number of 3D curves.

Then, the pixels on each 3D curve or the points described as having the same size are arranged along a straight line on the same plane to complete straightening of one 3D curve, and the pixel on a 2D straight line segment formed after straightening with a length x from an end part corresponds to the pixel value of the point on the 3D curve with a chord length x from the same end part to complete straightening of a single 3D curve.

The above steps are repeated to straighten all 3D curves forming the 3D curved surface, and straightening of the 3D curved surface is completed, thus acquiring the flat planar image of the curved book page opened.

The forgoing is only preferred detailed embodiments of the present invention, but does not limit the protection scope of the present invention. The equal replacement or amendment made by those skilled in the art in the technical scope disclosed by the present invention according to the technical solutions and the inventive concept of the present invention shall fall within the protection scope of the present invention.

The invention claimed is:

1. A method for flattening a laser-based image of a curved book page, comprising:

placing an opened book on a scanning platform that is horizontally arranged, and emitting a laser beam to a curved book page, wherein the laser beam forms a plurality of parallel laser lines on the curved book page;

acquiring a horizontal image of the curved book page having the plurality of parallel laser lines, and acquiring a 2D planar coordinate (x, y) of each pixel on each of the plurality of parallel laser lines in the horizontal image;

calculating an actual spatial height of a pixel on one of the plurality of parallel laser lines according to a tangent function using a y-coordinate of an intersection line of the laser beam and the scanning platform, and an intersection angle of the laser beam and the scanning platform;

repeating the calculating step for all pixels on each of the plurality of parallel laser lines to obtain the actual spatial heights of all pixels on each laser line;

constructing a 3D spatial curve for each of the plurality of parallel laser lines;

constructing a 3D curved surface of the acquired book page using the 3D spatial curves for all of the plurality of parallel laser lines;

associating pixels on the 3D curved surface with pixels in the horizontal image of the curved book page;

replacing a pixel value of each of the pixels on the 3D curved surface with a pixel value of a corresponding pixel thereof in the horizontal image to transform a page content from a planar image of the curved book page to the 3D curved surface.

2. The method for flattening a laser-based image of a curved book page according to claim 1, wherein the calculating step comprises:

calculating, according to the y-coordinate in the 2D planar coordinate (x, y), a distance difference d between an orthographic projection point of an intersection point on the scanning platform and the intersection line of the laser beam and the scanning platform, the intersection point being a point where the pixel intersects the curved surface of the book page, d=I1−y, wherein I1 represents a distance between the intersection line and an orthographic projection of a starting point of the laser beam on the scanning platform, the intersection line being a line where the laser beam intersects with the scanning platform, wherein the actual spatial height of the pixel $f(a,d)$ is calculated according to formula (1):

$$f(a,d)=\tan(a)*d \quad (1).$$

3. The method for flattening a laser-based image of a curved book page according to claim 1, wherein the associating step comprises:

according to the z-coordinate in each point (x, y, z) in the 3D curved surface, and an intersection angle between a connecting line and a virtual plane, the connecting line connecting a focal point of a camera in the image acquisition device with a pre-calibrated height and the point in the 3D curved surface, and by means of a trigonometric function, calculating to obtain a distance d' from the point on the laser line to a center point of a plane where the point is located and the plane is parallel to a plane of the scanning platform, and to calculate a projection coefficient $f(x)$ according to formula (2); the virtual plane being the plane where the point in the 3D curved surface is located, which is parallel to the scanning platform;

$$f(x)=L/d' \quad (2)$$

wherein, L represents a distance between an intersection point and a geometric center of the scanning platform, the intersection point being a point where a line intersects a plane of the scanning platform, wherein the line leads from a point C right above the geometric center of the scanning platform and passing through the point C; and obtaining a point T on the constructed 3D curved surface corresponding to the pixel of the planar image according to formula (3):

$$T = P \cdot f(x) \qquad (3),$$

wherein P represents a coordinate (x, y) of the 3D pixel in the horizontal image.

4. The method for flattening a laser-based image of a curved book page according to claim 1, wherein the flattening step comprises:

dividing the 3D curved surface into a plurality of 3D curves along an x-coordinate axis direction, arranging the pixels on each of the plurality of 3D curves along a corresponding 2D straight line, assigning a value to a pixel on the 2D straight line at a distance x from an end point of the 2D straight line with a value of the pixel on the 3D curve with a chord length x from the end point of the 3D curve to complete straightening of a single 3D curve; and repeating the above steps to each of the plurality of 3D curves to flatten the 3D curved surface.

\* \* \* \* \*